(12) United States Patent
Oumi

(10) Patent No.: US 10,661,440 B2
(45) Date of Patent: May 26, 2020

(54) ROBOT TEACHING DEVICE FOR WARNING OR CORRECTING POSITIONAL DEVIATION OF TEACHING POINTS OR TEACHING LINE

(71) Applicant: FANUC CORPORATION, Yamanashi (JP)

(72) Inventor: Tatsuya Oumi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 58 days.

(21) Appl. No.: 16/149,135

(22) Filed: Oct. 2, 2018

(65) Prior Publication Data

US 2019/0126470 A1 May 2, 2019

(30) Foreign Application Priority Data

Oct. 31, 2017 (JP) .................................. 2017-210694

(51) Int. Cl.
*B25J 9/16* (2006.01)
*G05B 19/42* (2006.01)
*B25J 11/00* (2006.01)

(52) U.S. Cl.
CPC ............. *B25J 9/163* (2013.01); *B25J 9/1653* (2013.01); *B25J 9/1664* (2013.01); *B25J 11/005* (2013.01); *G05B 19/42* (2013.01)

(58) Field of Classification Search
CPC ........ B25J 9/163; B25J 11/005; B25J 9/1664; B25J 9/1653; G05B 19/42
USPC ................................................. 700/245, 254
See application file for complete search history.

(56) References Cited

U.S. PATENT DOCUMENTS

| | | | | |
|---|---|---|---|---|
| 5,489,759 A | * | 2/1996 | Litt ...................... | B23K 9/124 219/124.34 |
| 5,845,053 A | * | 12/1998 | Watanabe ................ | B23K 9/12 700/262 |
| 6,332,101 B1 | * | 12/2001 | Kaneko .................. | B25J 9/1692 700/245 |
| 6,836,702 B1 | * | 12/2004 | Brogårdh ............... | B23K 26/04 318/568.1 |
| 7,643,905 B2 | * | 1/2010 | Watanabe .............. | B25J 9/1656 318/568.1 |

(Continued)

FOREIGN PATENT DOCUMENTS

JP H2-218571 A 8/1990
JP H8-300171 A 11/1996
(Continued)

*Primary Examiner* — Jaime Figueroa
(74) *Attorney, Agent, or Firm* — Hauptman Ham, LLP

(57) ABSTRACT

A robot teaching device includes a processing unit for performing processing to warn or correct positional deviation of teaching points or teaching lines. The processing unit includes a teaching position acquisition unit for acquiring four or more teaching positions from a set of target teaching points or a set of target teaching lines, a normal vector calculation section which calculates a normal vector satisfying the set of teaching positions, a distance calculation section which calculates a distance between two teaching positions most distant in the normal vector direction from among the set of teaching positions, and a first warning command section which issues a command, based on a distance between the two teaching positions which are most distant, to warn that the teaching points or teaching lines corresponding to the teaching positions have deviated from an actual plane of a workpiece.

10 Claims, 7 Drawing Sheets

(56) References Cited

U.S. PATENT DOCUMENTS

| | | | |
|---|---|---|---|
| 7,734,358 B2* | 6/2010 | Watanabe | G05B 19/425 318/568.15 |
| 9,278,449 B1* | 3/2016 | Linnell | B25J 9/163 |
| 2005/0102060 A1* | 5/2005 | Watanabe | B25J 9/1697 700/245 |
| 2005/0107920 A1* | 5/2005 | Ban | B25J 9/1692 700/245 |
| 2005/0251290 A1* | 11/2005 | Skourup | B25J 9/1664 700/245 |
| 2006/0030970 A1* | 2/2006 | Watanabe | G05B 19/425 700/248 |
| 2006/0136094 A1* | 6/2006 | Kubota | B25J 9/1638 700/245 |
| 2007/0021868 A1* | 1/2007 | Nagatsuka | G05B 19/416 700/245 |
| 2007/0282485 A1* | 12/2007 | Nagatsuka | B25J 9/1671 700/245 |
| 2010/0070077 A1* | 3/2010 | Le | B25J 9/1692 700/254 |
| 2010/0138042 A1* | 6/2010 | Kouno | B25J 9/1664 700/259 |
| 2010/0262288 A1* | 10/2010 | Svensson | B25J 9/1671 700/254 |
| 2011/0029132 A1* | 2/2011 | Nemmers | B25J 9/1692 700/254 |
| 2011/0106311 A1* | 5/2011 | Nakajima | B25J 9/1697 700/253 |
| 2011/0130864 A1* | 6/2011 | Hirota | B25J 9/1692 700/213 |
| 2012/0229291 A1* | 9/2012 | Mikalsen | B25J 9/1676 340/686.6 |
| 2016/0184996 A1* | 6/2016 | Ishige | B25J 9/1692 700/254 |
| 2017/0106533 A1* | 4/2017 | Minami | B25J 9/042 |
| 2018/0243854 A1* | 8/2018 | Yoshino | B23K 31/02 |

FOREIGN PATENT DOCUMENTS

| | | |
|---|---|---|
| JP | H11-191005 A | 7/1999 |
| JP | 2001-216015 A | 8/2001 |
| JP | 2004-17198 A | 1/2004 |
| JP | 2005-66797 A | 3/2005 |
| JP | 2006-331188 A | 12/2006 |
| JP | 2016-74063 A | 5/2016 |

* cited by examiner

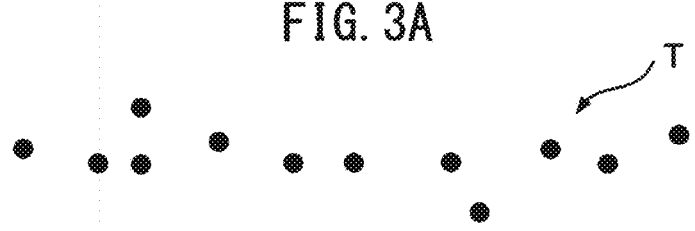
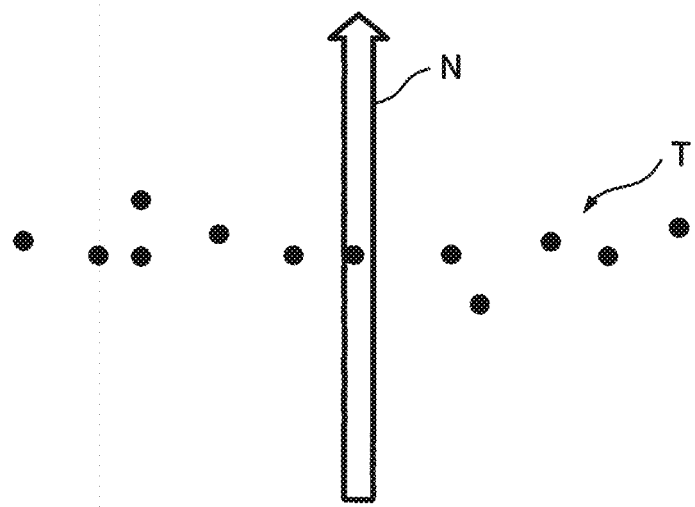
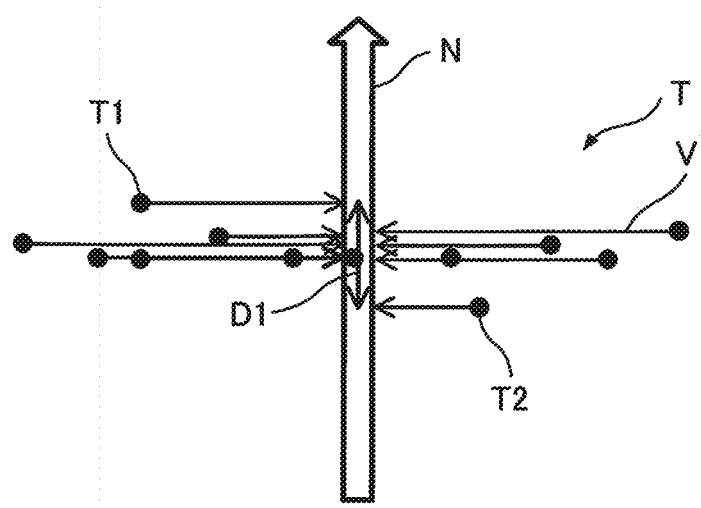

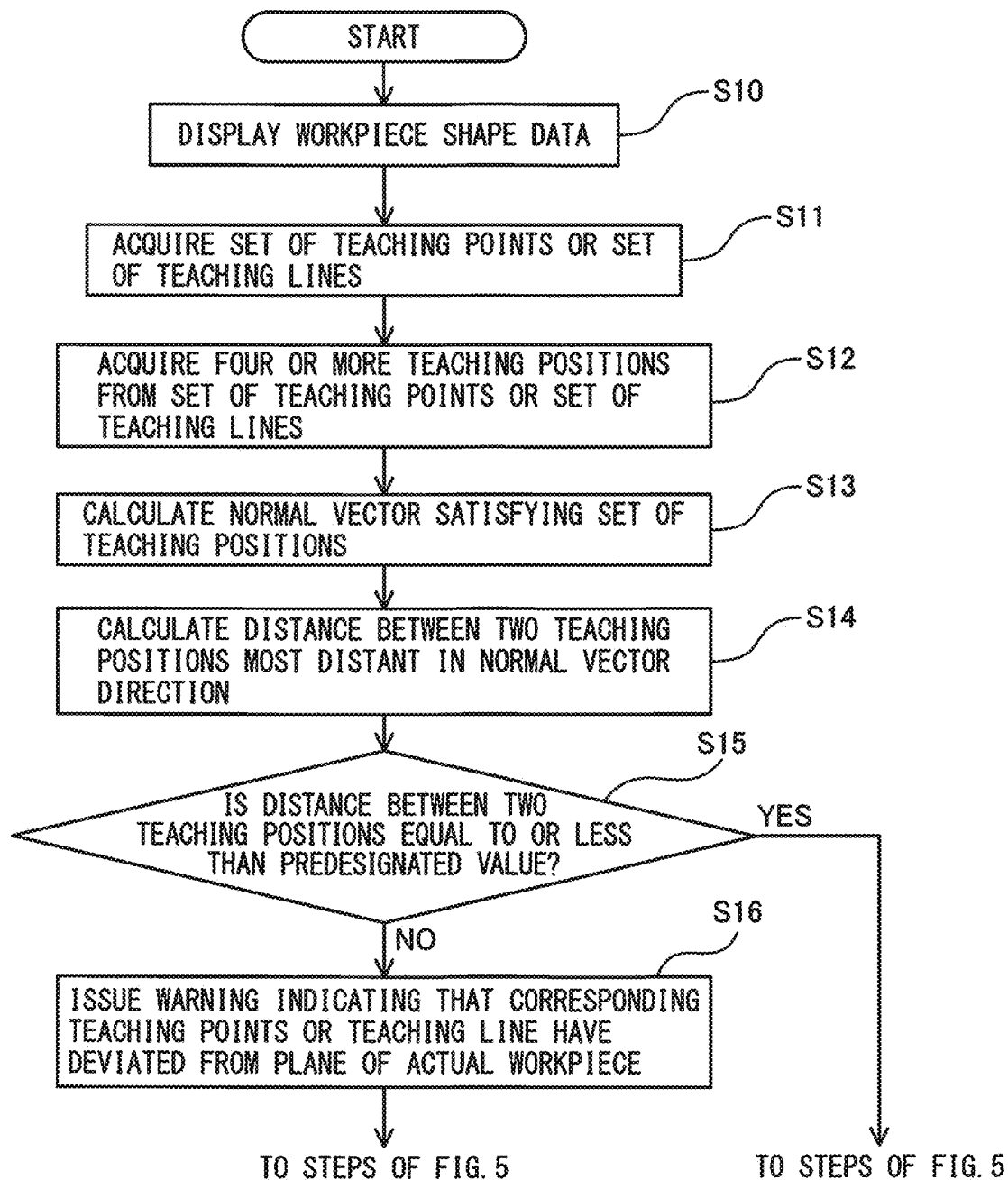

ROBOT TEACHING DEVICE FOR WARNING OR CORRECTING POSITIONAL DEVIATION OF TEACHING POINTS OR TEACHING LINE

RELATED APPLICATIONS

The present application claims priority of Japanese Patent Application No. 2017-210694, filed on Oct. 31, 2017, the disclosure of which is hereby incorporated by reference herein in its entirety.

BACKGROUND OF THE INVENTION

1. Field of the Invention

The present invention relates to a robot teaching device for warning or correction the positional deviation of teaching points or a teaching line.

2. Description of Related Art

In order to generate a motion program for a robot, a teaching operation to designate teaching points or a teaching line in a virtual space displaying workpiece shape data or a teaching operation in which teaching points or a teaching line are designated in a virtual space by direct teaching is performed. For robot tasks that deburr, polish, paint, etc., a workpiece, it may be necessary that such teaching points or teaching line be on one plane of the workpiece. For example, if the target of deburring is one plane of the workpiece, it is necessary that deburring be performed along such plane. However, in teaching operations, since the shape data of a workpiece is composed of a plurality of lines, there are problems in that the operator accidentally designates different lines, the operator designates teaching points at positions outside the plane of the actual workpiece due to operational errors, or the position error of the teaching points or teaching line designated by direct teaching is large, though this is not an operational error. Thus, it is necessary to verify whether the teaching points or teaching line are on the plane of the actual workpiece.

As a background technology related to the present invention, a technology in which a plane is calculated from a set of teaching points is known. For example, Japanese Unexamined Patent Publication (Kokai) No. 11-191005 discloses a robot control device including a paint gun and describes finding a plane determined by the three adjacent teaching points, calculating the normal vector to the obtained plane, and storing the direction of the normal vector as the orientation of the painting gun.

Japanese Unexamined Patent Publication (Kokai) No. 2004-017198 discloses a device for measuring the surface texture of a to-be-measured object and describes that a ball probe is brought into contact with three or more points on the surface, the position of the plane is calculated, and the withdraw direction is determined by the normal vector to the plane.

Japanese Unexamined Patent Publication (Kokai) No. 08-300171 discloses a method for detecting a normal vector in a three-dimensional laser machining device and describes finding a normal vector to a plane formed by three points on the surface of a workpiece near teaching points and matching the posture of a nozzle of a processing head to such normal vector.

SUMMARY OF INVENTION

In order to verify whether the teaching points or teaching line are on one plane, it is necessary to actually operate the robot and check the positions of the teaching points numerically. However, even the robot is actually moved, the extent of the positional deviation of the teaching points is not clear. Furthermore, it is difficult for a human to judge whether the teaching points or teaching line are on the plane from the numerical values. Thus, trial and error is necessary for verification of the positional deviation of the teaching points or teaching line, which causes a decrease in work efficiency.

Thus, a technique to automatically warn or correct teaching points or a teaching line that deviate from the plane of an actual workpiece is desired.

An aspect of the present disclosure provides a robot teaching device for generating a robot motion program, configured to perform a teaching operation for designating teaching points or a teaching line in a virtual space, comprising a processing unit for executing processing for warning or correcting a positional deviation of the teaching points or teaching line, the processing unit comprising a teaching position acquisition section which acquires not less than four teaching positions from a set of target teaching points or a set of target teaching lines, a normal vector calculation section which calculates a normal vector satisfying the set of teaching positions, a distance calculation section which calculates a distance between two teaching positions most distant in the direction of the normal vector from among the set of teaching positions, and a first warning command section which issues a command, based on a distance between the two teaching positions which are most distant, to warn that the teaching points or teaching line corresponding to the teaching position have deviated from an actual plane of a workpiece.

The term "deviated" includes "roughly deviated" since the direction of the calculated normal vector may not completely match the direction of the normal vector in the plane of the actual workpiece.

According to another aspect of the present disclosure, provided is a robot teaching device for generating a robot motion program, configured to perform a teaching operation for designating teaching points or a teaching line in a virtual space, comprising a processing unit which executes processing for warning or correcting a positional deviation of the teaching points or teaching line, the processing unit comprising a teaching position acquisition section which acquires not less than four teaching positions from a set of target teaching points or a set of target teaching lines, a normal vector calculation section which calculates a normal vector satisfying the set of teaching positions, an average position calculation section which calculates an average position of the set of the teaching positions, a virtual plane calculation section which calculates a virtual plane which passes through the calculated average position and is perpendicular to the normal vector, and a warning command section which issues a command, based on a distance from each of the teaching positions to the virtual plane, to warn that the teaching points or teaching line corresponding to the teaching position has deviated from a plane of a workpiece.

The term "deviated" includes "roughly deviated" since there is a risk that the position and orientation of the calculated virtual plane may not exactly match the position and orientation of the plane of the actual workpiece.

According to yet another aspect of the present disclosure, provided is a robot teaching device for generating a robot motion program, configured to perform a teaching operation for designating teaching points or a teaching line in a virtual space, comprising a processing unit for executing processing for correcting a positional deviation of the teaching point or teaching line, the processing unit comprising a teaching position acquisition section which acquires not less than four teaching positions from a set of target teaching points or a set of target teaching lines, a normal vector calculation section which calculates a normal vector satisfying the set of teaching positions, an average position calculation section which calculates an average position of the set of teaching positions, a virtual plane calculation section which calculates a virtual plane which passes through the calculated average position and is perpendicular to the normal vector, and a teaching position correction section which corrects a positional deviation of the teaching points or teaching line corresponding to the teaching position by shifting all of the teaching positions onto the virtual plane.

BRIEF DESCRIPTION OF THE DRAWINGS

FIG. 3A is a side view showing a method for acquiring not less than four teaching positions according to the embodiment.

FIG. 3B is a side view showing a method for calculating a normal vector according to the embodiment.

FIG. 3C is a side view showing a method for calculating the distance between two teaching positions most distant in a normal vector direction according to the embodiment.

FIG. 4 is a flowchart showing the operation of the robot teaching device according to the embodiment.

DETAILED DESCRIPTION

Figure 1:
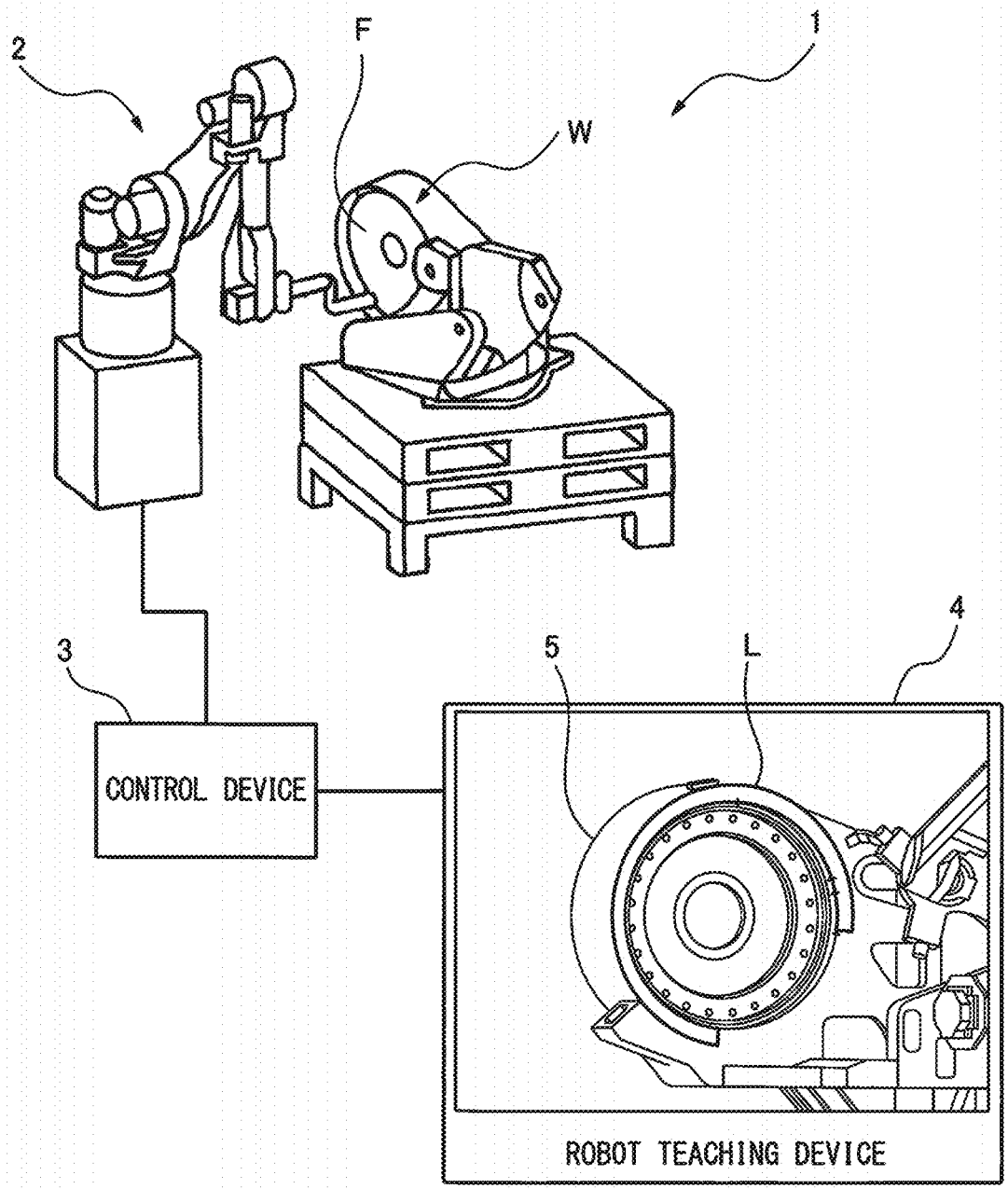
FIG. 1 is a schematic view showing the configuration of the robot machining system according to an embodiment.

The embodiments of the present invention will be described below with reference to the accompanying drawings. In the drawings, the same or similar components are given the same or similar reference numerals. Furthermore, the embodiments described below do not limit the technical scope of the invention or the meanings of the terms described in the claims.

FIG. 1 is a schematic view showing the configuration of a robot machining system 1 according to the present embodiment. The robot machining system 1 includes a robot 2 for deburring, polishing, painting, etc., a workpiece W having at least one plane F, a control device 3 for controlling the movement of the robot 2, and a robot teaching device 4 which performs a teaching operation in which teaching points or teaching lines are designated in a virtual space displaying shape data S of the workpiece or a teaching operation in which teaching points or teaching lines are designated in a virtual space by direct teaching in order to generate a motion program for the robot 2. The robot 2 is composed of a multi-axis jointed manipulator including a servo motor, etc., the control device 3 is composed of a control device including a CPU, RAM, ROM, an input/output interface, etc., and the robot teaching device 4 is composed of a computer such as a portable teach pendant or a laptop.

Figure 2:
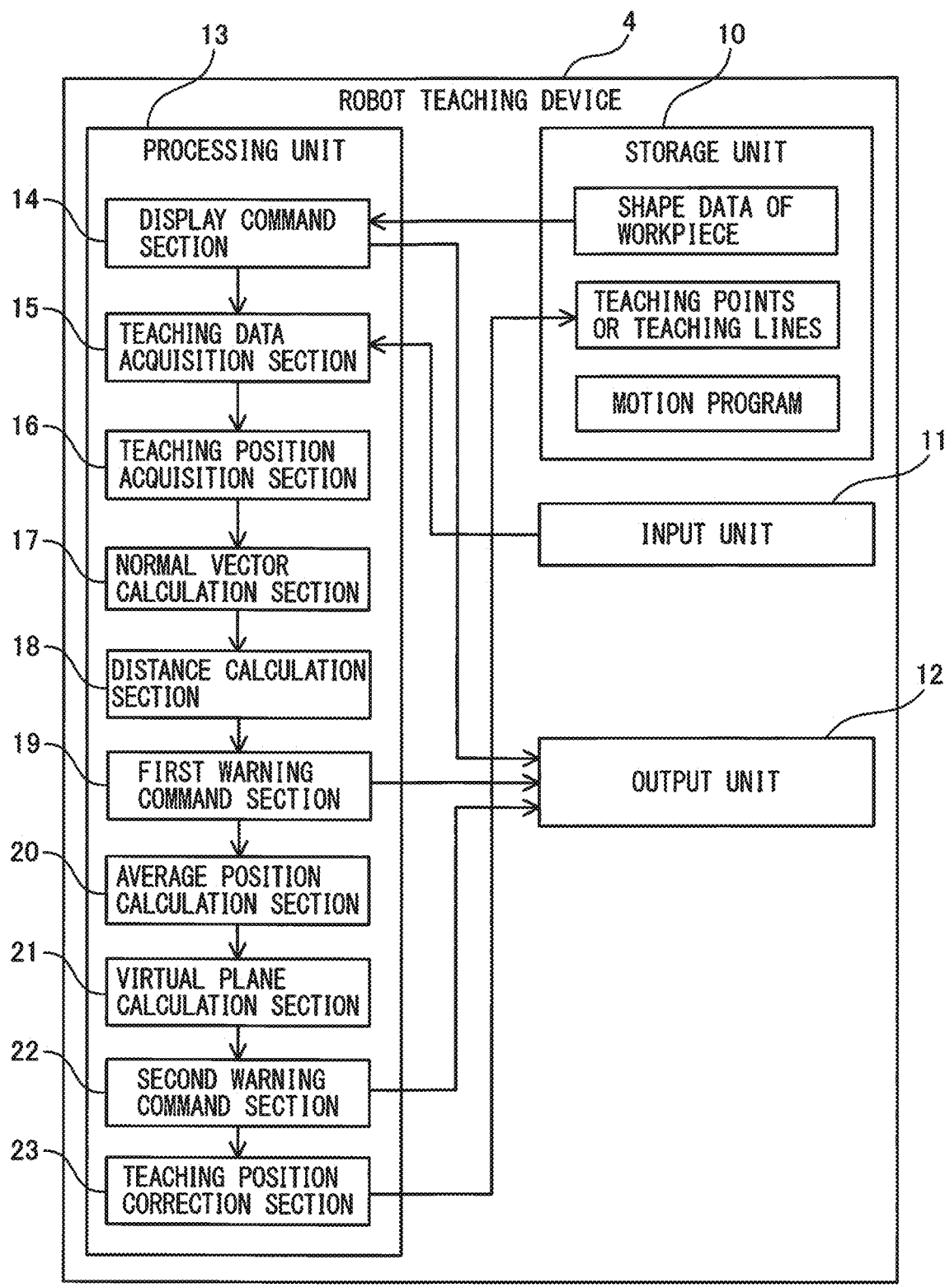
FIG. 2 is a block diagram showing the configuration of a robot teaching device according to the embodiment.

FIG. 2 is a block diagram showing the configuration of the robot teaching device 4 according to the present embodiment. The robot teaching device 4 includes a storage unit 10 composed of a RAM, ROM, or non-volatile memory, an input unit 11 composed of a touch panel, mouse, or keyboard and an input interface, an output unit 12 composed of a display panel, speaker, and an output interface, and a processing unit 13 composed of a CPU, an ASIC, or an FPGA, which executes various programs. The storage unit 10, input unit 11, output unit 12, and processing unit 13 are connected to each other through busses or the like.

The components of the processing unit 13 can be realized by a program module executed by the CPU, an integrated circuit composed of an ASIC or an FPGA, or the like. The processing unit 13 includes a display command section 14 which executes commands to read the shape data S of the workpiece W from the storage unit 10 and display the same and a teaching data acquisition section 15 which acquires the data of a set of teaching points or teaching lines input from the input unit 11. The display command section 14 issues a display command to the output unit 12 and the output unit 12 displays the shape data S of the workpiece W on the display panel (refer to FIG. 1). The processing unit 13 further includes a teaching position acquisition section 16 which acquires four or more teaching positions from a set of teaching points or a set of teaching lines and a normal vector calculation section 17 which calculates a normal vector satisfying the four or more teaching positions.

The processing unit 13 further includes a distance calculation section 18 which calculates the distance between two teaching points most distant in the normal vector direction from among the set of teaching positions and a first warning command section 19 which issues a command to warn that the teaching points or teaching line corresponding to the teaching position has deviated from the plane F of the actual workpiece W when the distance between the two most distant teaching positions exceeds a predetermined value. The warning command issued by the first warning command section 19 is issued to the output unit 12, and the commanded output unit 12 displays the warning contents on the display panel or emits a warning sound from a speaker.

The processing unit 13 may further include an average position calculation section 20 which calculates the average position of the set of teaching positions, a virtual plane calculation section 21 which calculates a virtual plane which passes through the calculated average position and is perpendicular to the normal vector, and a second warning command section 22 which issues a command, based on a distance from each of the teaching positions to the virtual plane, to warn that the teaching points or teaching line corresponding to the teaching position has deviated from the plane F of the actual workpiece W. These components (the average position calculation section 20, virtual plane calculation section 21, and second warning command section 22) are not indispensable components. If the processing unit 13 includes these components, the distance calculation section 18 and the first warning command section 19 are not indispensable components. Furthermore, by performing double warning processing in the first warning command section 19 and the second warning command section 22, it is possible to obtain the effect that the detection accuracy of the positional deviation of the teaching points or teaching line is increased.

The processing unit 13 may further include a teaching position correction section 23 which corrects a positional deviation of the teaching points or teaching line corresponding to the teaching position by shifting all of the teaching positions or only the teaching positions for which a warning has been issued onto the virtual plane. The teaching position correction section 23 is not an indispensable component. If the processing unit includes the teaching position correction section 23, the distance calculation section 18, the first warning command section 19, and the second warning command section 22 are not indispensable components. The teaching points or teaching lines corrected by the teaching position correction section 23 are stored in the storage unit 10. The robot teaching device 4 generates the motion program of the robot 2 in accordance with the teaching points or teaching lines stored in the storage unit 10.

FIG. 3A is a side view showing a method for acquiring four or more teaching positions according to the present embodiment. When the acquired teaching data is a set of "teaching points", the set of four or more teaching positions is acquired by obtaining four or more arbitrary teaching points. When the acquired teaching data is a set of "teaching lines", the set of four or more teaching positions is acquired by obtaining four or more arbitrary points on the teaching line. The reason that four or more teaching positions are acquired is because if "three teaching positions" are acquired, all three teaching points are on one virtual plane perpendicular to the normal vector, and consequently, the positional deviation of the teaching points or teaching lines cannot be verified. Furthermore, if "two or less teaching positions" are acquired, neither a normal vector satisfying the teaching positions nor a virtual plane perpendicular to the normal vector can be calculated.

FIG. 3B is a side view showing a method for calculating the normal vector N according to the present embodiment. Calculation of the normal vector N can be performed using a known method in the technical field of the calculation of three-dimensional polygons such as Newell's Method. In Newell's Method, first, the normal vector N is calculated by obtaining the vector product (cross product) of two sides of a triangle composed of any three teaching positions. At the vertex p1 of the triangle (p1, p2, p3), if the two side vectors are vector U=p2−p1 and vector V=p3−p1, the normal vector N=U×V is calculated according to the following formulae.

$Nx=UyVz-UzVy$ $Ny=UzVx-UxVz$ $Nz=UxVy-UyVx$ [Equation 1]

Next, moving from the vertex p1 of the current triangle to the vertex p4 of the next arbitrary triangle, a new normal vector N is calculated by the following formulae.

$Nx=Nx+(p1·y-p4·y)(p1·z+p4·z)$ $Ny=Ny+(p1·z-p4·z)(p1·x+p4·x)$ $Nz=Nz+(p1·x-p4·x)(p1·y+p4·y)$ [Equation 2]

For all sets T of teaching positions, the final normal vector N is calculated by repeating the calculations of Equation 2.

FIG. 3C is a side view showing a method for calculating the distance between two teaching positions T1, T2 most distant from each other in the normal vector direction according to the present embodiment. First, the normal lines V to the normal vector N from the respective teaching positions is calculated. Next, the distance of the two intersection points most distant from among the set of intersection points of each normal line V and normal vector N is calculated. As a result, the distance D1 of the two teaching positions T1, T2 most distant in the normal vector N direction is calculated. When the calculated distance D1 of the two teaching positions T1, T2 exceeds a predesignated value, a warning that the teaching points or teaching line corresponding to the teaching positions have deviated from the plane F of the workpiece W is issued.

Figure 3D:
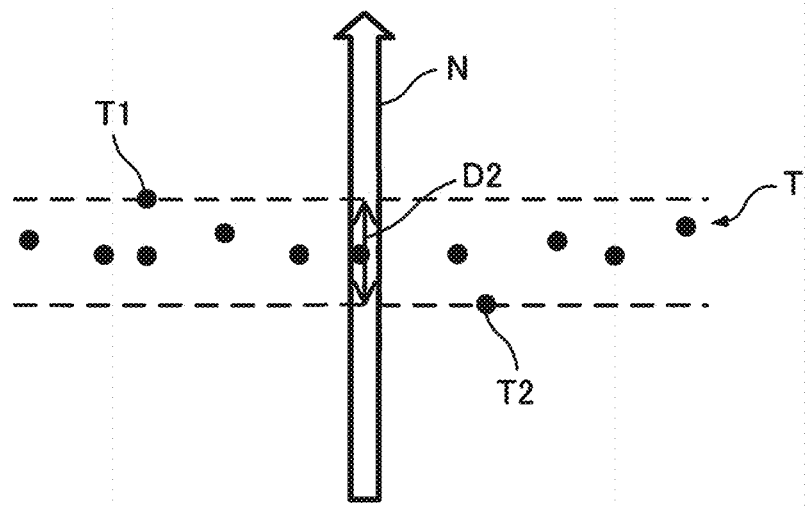
FIG. 3D is a side view showing a method for calculating the distance between two teaching positions most distant in the normal vector direction according to an alternative embodiment.

FIG. 3D is a side view showing a method for calculating the distance of two teaching positions T1, T2 most distant in the normal vector direction according to an alternative embodiment. In the alternative embodiment, first, coordinate transformation is performed on the set T of teaching positions so that the normal vectors N become one coordinate axis. Since the set T of coordinate-transformed teaching positions includes coordinate values in the normal vector direction, the distance D2 of the two teaching positions T1, T2 most distant in the normal vector N direction is calculated by comparing the coordinate values of the set T of teaching positions in the normal vector direction. When the distance D2 of the two calculated teaching positions T1, T2 exceeds a predesigned value, a warning indicated that the teaching points or teaching line corresponding to such teaching positions have deviated from the plane F of the workpiece W is issued.

Figure 3E:
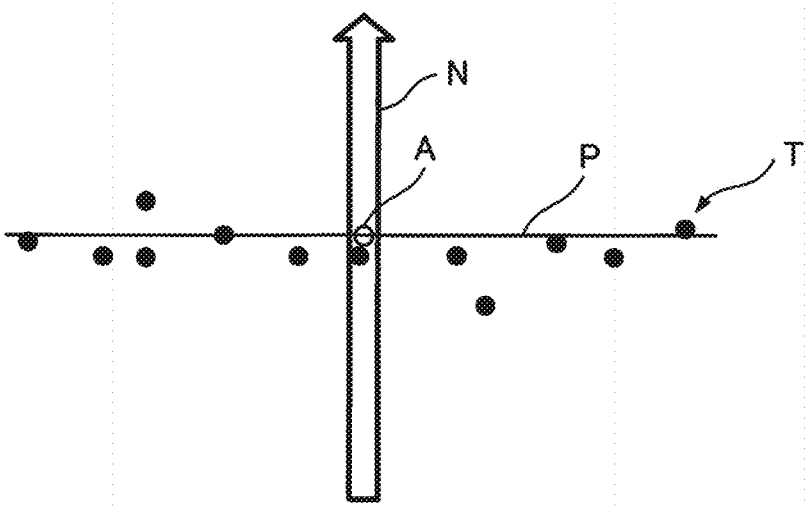
FIG. 3E is a side view showing a method for calculating an average position of a set of teaching positions and a virtual plane according to the embodiment.

FIG. 3E is a side view showing a method for calculating the average position A of the set T of teaching positions and the virtual plane P according to the present embodiment. The average position A of the set T of teaching positions is calculated by calculating the average position of the set of intersection points of the normal line V and each of the normal vectors N shown in FIG. 3C. As an alternative embodiment, the average position A of the set T of teaching positions may be calculated by performing coordinate transformation on the set T of teaching positions so that the normal vectors N become one coordinate axis and calculating the average value of the coordinate values of the set of coordinate-transformed teaching positions in the normal vector direction. The virtual plane P is calculated on the condition that the plane P passes through the calculated average position A and is perpendicular to the normal vector N.

Figure 3F:
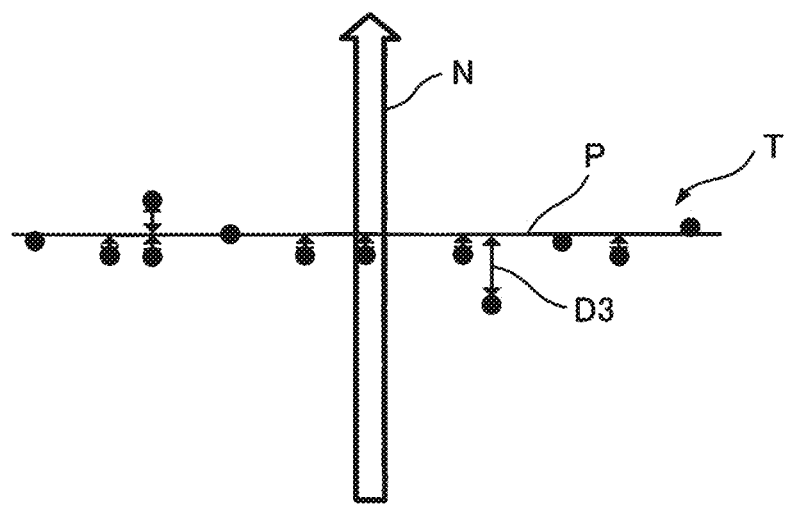
FIG. 3F is a side view showing a method for calculating the distance of each of the teaching positions from the virtual plane according to the embodiment.

FIG. 3F is a side view showing a method for calculating the distance from each of the teaching positions to the virtual plane P according to the present embodiment. The distance D3 from each of the teaching positions to the virtual plane P is calculated by calculating the distance between the intersection point of each of the normal lines V and the normal vector N and the average position of the set of intersection points. As an alternative embodiment, the distance D3 from each of the teaching positions to the virtual plane P may be calculated by performing coordinate transformation on the set T of teaching positions so that the normal vectors N become a single coordinate axis, and calculating the distance between the coordinate values of the set T of coordinate-transformed teaching positions in the normal vector direction and the average position A of the set T of teaching positions.

When the distance D3 from each of the calculated teaching positions to the virtual plane P exceeds one-half of the predesignated value, a warning indicating that the teaching points or teaching line corresponding to such teaching positions have deviated from the plane F of the actual workpiece W is issued. "One-half" of the predesignated value corresponds to a tolerance above the virtual plane P or a tolerance below the virtual plane P. By setting "one-half" of the predesignated value, the threshold values in the double-warning processing can be combined into a single value (the "predesignated value").

Figure 3G:
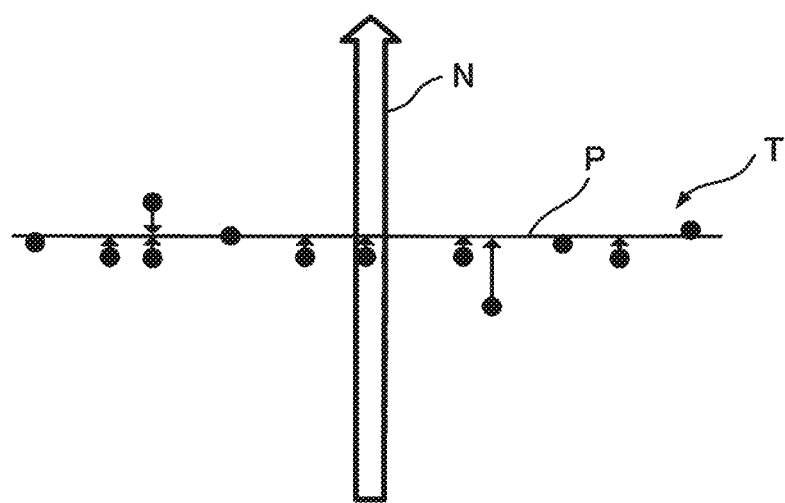
FIG. 3G is a side view showing a method for correcting the teaching positions according to the embodiment.

FIG. 3G is a side view showing a method for correcting teaching positions according to the present embodiment. The positional deviation of the teaching points or teaching lines is corrected by shifting all of the teaching positions onto the virtual plane. As an alternative embodiment, the positional deviation of the teaching points or teaching lines may be corrected by shifting only the teaching positions for which a warning has been issued onto the virtual plane P.

Figure 5:
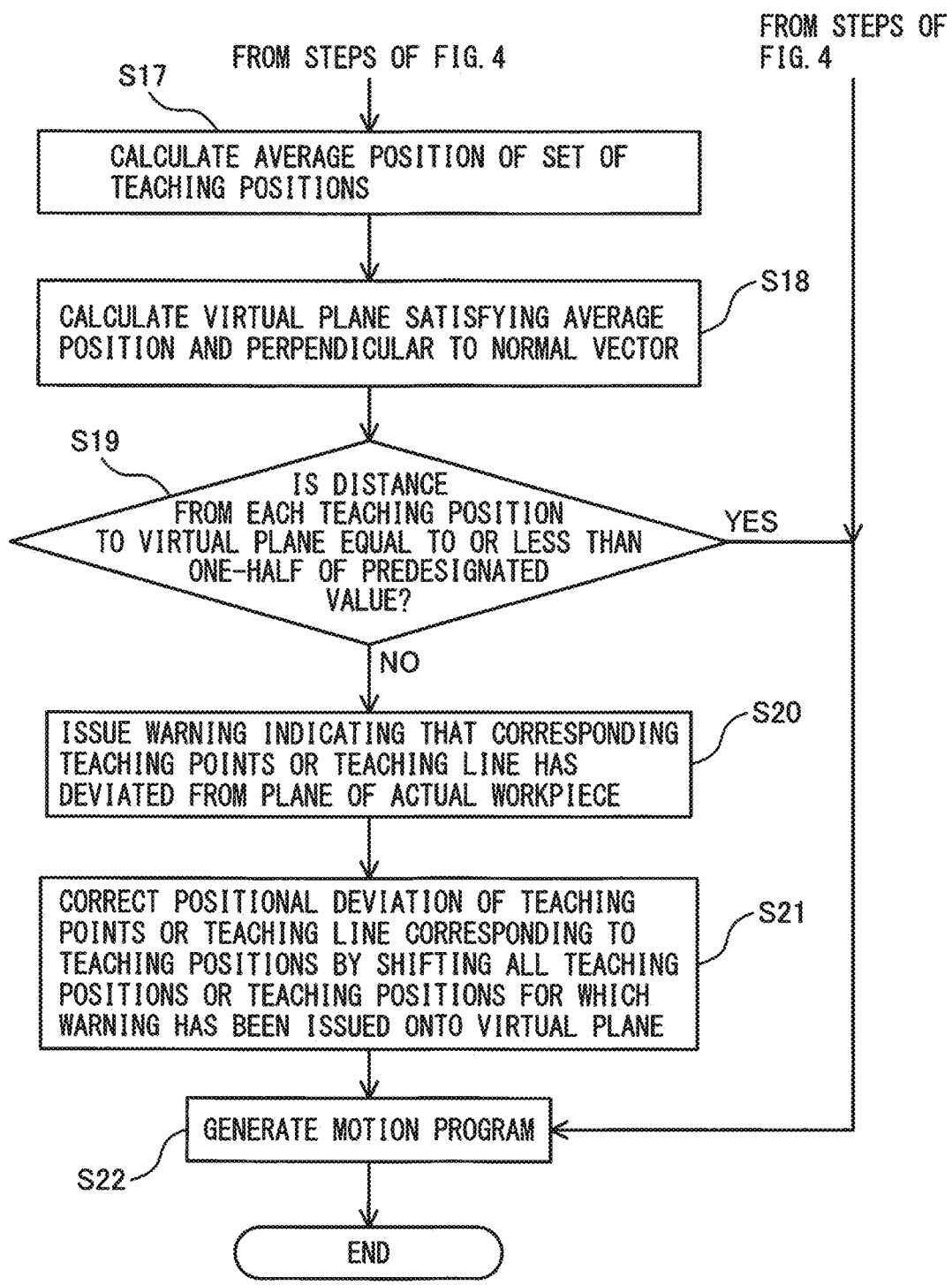
FIG. 5 is a flowchart showing the operation of the robot teaching device according to the embodiment.

FIGS. 4 and 5 are flowcharts showing the operations of the robot teaching device 4 according to the present embodiment. When the robot teaching device 4 starts processing to warn or correct the positional deviation of the teaching points or teaching line, first, in step S10, a command is issued to retrieve the shape data S of the workpiece from the storage unit 10 and display the same on the display panel. In step S11, data of the set of teaching points or the set of teaching lines is acquired. In step S12, a set T of four or more teaching positions is acquired from the set of teaching points or set of teaching lines (refer to FIG. 3A). In step S13, the normal vector N satisfying the set T of teaching positions is calculated (refer to FIG. 3B). In step S14, the distance D1 or D2 of the two teaching positions T1, T2 most distant in the normal vector N direction is calculated (refer to FIG. 3C or FIG. 3D). In Step S15, it is determined whether or not the distance D1 or D2 of the two teaching positions T1, T2 is not more than the predesignated value. When the distance D1 or D2 of the two teaching positions T1, T2 exceeds the predesignated value (NO in step S15), in step S16, a command to issue a warning indicating the teaching points or teaching line corresponding to such teaching positions have deviated from the plane F of the actual workpiece W is issued. When the distance D1 or D2 of the two teaching positions T1, T2 is equal to or less than the predesignated value (YES in step S15), since the teaching points or teaching line do not deviate from the plane F of the actual workpiece W, in step S22 of FIG. 5, a motion program of the robot 2 is generated in accordance with such teaching points or teaching line. Thereafter, processing to warn or correct the positional deviation of the teaching points or teaching line ends.

Referring to FIG. 5, in step S17, the average position A of the set of teaching positions is calculated (refer to FIG. 3E). In step S18, the virtual plane P which passes through the calculated average position A and which is perpendicular to the normal vector N is calculated (refer to FIG. 3F). In step S19, it is determined whether the distance D3 from each of the teaching positions to the virtual plane P is equal to or less than one-half of the predesignated value (refer to FIG. 3F). When the distance D3 from each of the teaching positions to the virtual plane P exceeds one-half of the predesignated value (NO in step S19), in step S20, a command to issue a warning indicating that the teaching points or teaching line corresponding to such teaching points have deviated from the plane F of the actual workpiece W is issued. When the distance D3 from each of the teaching positions to the virtual plane P is equal to or less than one-half of the predesignated value (YES in step S19), since the teaching points or teaching line do not deviate from the plane F of the actual workpiece W, in step S22, a motion program for the robot 2 is generated in accordance with such teaching points or teaching line. Thereafter, the processing to correct the positional deviation of the teaching points or teaching line ends. The warning processing of step S17 to step S20 is not an indispensable processing. If the warning processing of step S17 to step S20 is performed, the warning processing of step S14 to step S16 is not an indispensable processing. Furthermore, by performing the double warning processing of step S14 to step S20, the effect that the accuracy of detecting the positional deviation of the teaching points or teaching line increases can be obtained.

In step S21, by shifting all of the teaching positions or the teaching positions for which a warning has been issued onto the virtual plane P, the positional deviation of the teaching points or teaching line corresponding to such teaching positions is corrected. In step S22, the motion program of the robot 2 is generated in accordance with the corrected teaching points or teaching line. Thereafter, the processing to warn or correct the positional deviation of the teaching points or teaching line ends.

According to the robot teaching device 4 according to the embodiments described above, teaching points or teaching lines which have deviated from the plane F of the actual workpiece W can be automatically warned or corrected. Additionally, trial and error in the verification of the positional deviation of the teaching points or teaching lines becomes unnecessary, whereby work efficiency can be improved.

The program according to the embodiments described above can be provided in a computer readable non-transitory recording medium such as, for example, a CD-ROM. While various embodiments have been described in the present specification, the present invention is not limited to the various embodiments described above, and it can be recognized that various modifications may be made within the scope of the following claims.

The invention claimed is:

1. A robot teaching device for generating a robot motion program, configured to perform a teaching operation for designating teaching points or a teaching line in a virtual space, comprising:
   a processing unit which executes processing for warning or correcting a positional deviation of the teaching points or teaching line,
   the processing unit comprising:
      a teaching position acquisition section which acquires not less than four teaching positions from a set of target teaching points or a set of target teaching lines,
      a normal vector calculation section which calculates a normal vector satisfying the set of teaching positions,
      a distance calculation section which calculates a distance between two teaching positions most distant in the direction of the normal vector from among the set of teaching positions, and
      a first warning command section which issues a command, based on a distance between the two teaching positions which are most distant, to warn that the teaching points or teaching line corresponding to the teaching position have deviated from an actual plane of a workpiece.

2. The robot teaching device according to claim 1, wherein the distance calculation section calculates a distance between two teaching positions most distant in the direction of the normal vector by calculating a normal line to the normal vector from each of the teaching positions and calculating a distance between two intersection points most distant from a set of intersection points of the respective normal lines and the normal vector.

3. The robot teaching device according to claim 1, wherein the processing unit further comprises:

an average position calculation section which calculates an average position of the set of teaching positions, a virtual plane calculation section which calculates a virtual plane which passes through the calculated average position and is perpendicular to the normal vector, and a second warning command section which issues a command, based on a distance from each of the teaching positions to the virtual plane, to warn that the teaching points or teaching line corresponding to the teaching position have deviated from a plane of a workpiece.

4. The robot teaching device according to claim 3, wherein the average position calculation section calculates the average position of the set of teaching positions by calculating a normal line to the normal vector from each of the teaching positions and calculating an average position of a set of intersections of each of the normal lines and the normal vector.

5. The robot teaching device according to claim 3, wherein the processing unit further comprises:

a teaching position correction section which corrects a positional deviation of the teaching points or teaching line corresponding to the teaching position by shifting all of the teaching positions or the teaching positions for which a warning has been issued onto the virtual plane.

6. A robot teaching device for generating a robot motion program, configured to perform a teaching operation for designating teaching points or a teaching line in a virtual space, comprising:

a processing unit which executes processing for warning or correcting a positional deviation of the teaching points or teaching line, the processing unit comprising:

a teaching position acquisition section which acquires not less than four teaching positions from a set of target teaching points or a set of target teaching lines, a normal vector calculation section which calculates a normal vector satisfying the set of teaching positions, an average position calculation section which calculates an average position of the set of the teaching positions, a virtual plane calculation section which calculates a virtual plane which passes through the calculated average position and is perpendicular to the normal vector, and a warning command section which issues a command, based on a distance from each of the teaching positions to the virtual plane, to warn that the teaching points or teaching line corresponding to the teaching position has deviated from a plane of a workpiece.

7. The robot teaching device according to claim 6, wherein the average position calculation section calculates the average position of the set of teaching positions by calculating a normal line to the normal vector from each of the teaching positions and calculating an average position of a set of intersections of each of the normal lines and the normal vector.

8. The robot teaching device according to claim 6, wherein the processing unit further comprises:

a teaching position correction section which corrects a positional deviation of the teaching points or teaching line corresponding to the teaching position by shifting all of the teaching positions or the teaching positions for which a warning has been issued onto the virtual plane.

9. A robot teaching device for generating a robot motion program, configured to perform a teaching operation for designating teaching points or a teaching line in a virtual space, comprising:

a processing unit which executes processing for correcting a positional deviation of the teaching point or teaching line, the processing unit comprising:

a teaching position acquisition section which acquires not less than four teaching positions from a set of target teaching points or a set of target teaching lines, a normal vector calculation section which calculates a normal vector satisfying the set of teaching positions, an average position calculation section which calculates an average position of the set of teaching positions, a virtual plane calculation section which calculates a virtual plane which passes through the calculated average position and is perpendicular to the normal vector, and a teaching position correction section which corrects a positional deviation of the teaching points or teaching line corresponding to the teaching position by shifting all of the teaching positions onto the virtual plane.

10. The robot teaching device according to claim 9, wherein the average position calculation section calculates the average position of the set of teaching positions by calculating a normal line to the normal vector from each of the teaching positions and calculating an average position of a set of intersections of each of the normal lines and the normal vector.

* * * * *